Sept. 7, 1948.  J. B. BRENNAN ET AL  2,448,513
ELECTROSTATIC CONDENSER PLATE
Filed Nov. 26, 1942
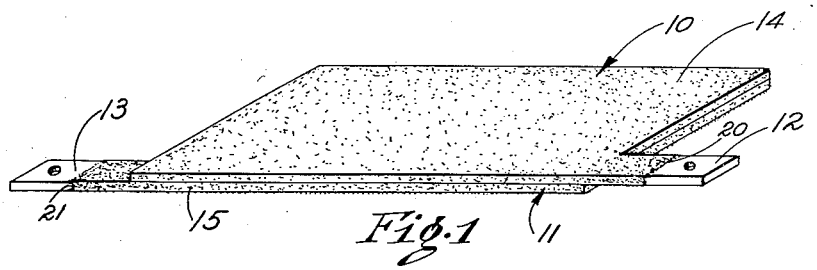
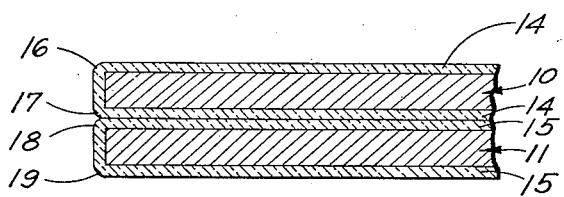
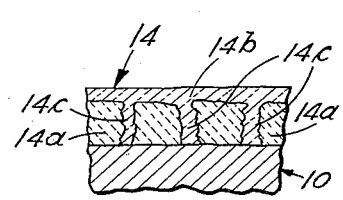
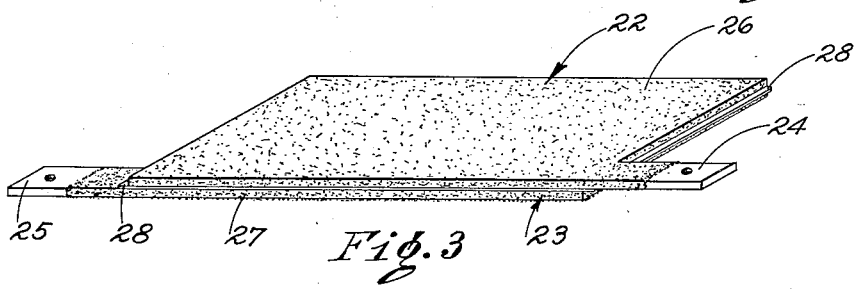
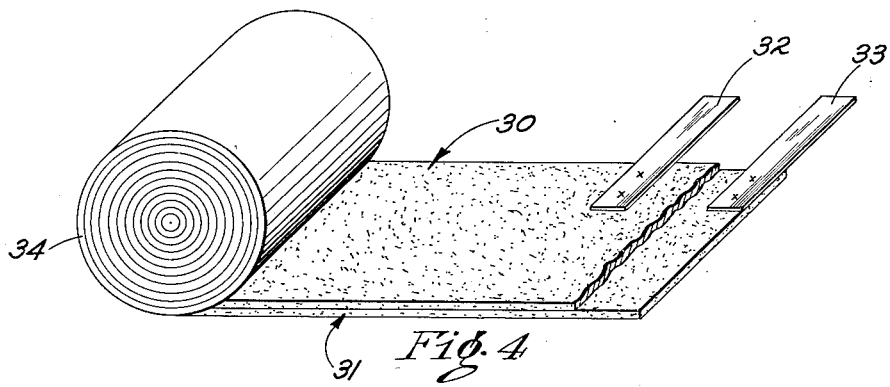
INVENTORS
JOSEPH B. BRENNAN
& LEONA MARSH CONRAD.
BY
Bosworth & Sessions
ATTORNEYS Patented Sept. 7, 1948

2,448,513

UNITED STATES PATENT OFFICE 2,448,513

ELECTROSTATIC CONDENSER PLATE

Joseph B. Brennan, Bratenahl, and Leona Marsh Conrad, Cleveland, Ohio; said Conrad assignor to said Brennan Application November 26, 1942, Serial No. 467,044

1 Claim. (Cl. 204—38)

This invention relates to electrostatic condensers. Insofar as common subject matter is concerned, this application is a continuation in part of our prior application filed December 2, 1938, Serial No. 243,542, now Patent No. 2,346,658, issued April 18, 1944.

A general object of our present invention is to provide an efficient and compact electrostatic condenser and an economical method of making same. Another object is to provide an electrostatic condenser embodying plates in which the dielectric material is formed on the surface of the plates. Another object is to provide condensers embodying dielectric material of high dielectric strength and which may be very thin whereby a compact high voltage condenser of high capacity per unit of area of the plates can be obtained. A further object is to provide plates or sheets of aluminum and other film-forming metals having the surfaces thereof coated with uniform, thin, dielectric films of high dielectric strength and great resistance to corrosion. Another object is to provide a method whereby the thickness of the films may be regulated in accordance with the dielectric strength required. Another object is to provide such plates wherein the dielectric material is associated with the plate in such a way that the plates can be bent or formed to the desired shape without destroying the dielectric material. Another object is to provide condenser plates in which there is good adhesion between the dielectric material and the plates and wherein the possibility of voids is substantially eliminated. Another object is to provide a method of making such plates which can be carried out rapidly and economically and which will produce uniform results.

Further objects and advantages of my invention will become apparent from the following description of preferred forms thereof, reference being made to the accompanying drawings in which Figure 1 illustrates a condenser made according to my invention; Figure 2 is a fragmentary section through the condenser of Figure 1 as indicated by the line 2—2 of Figure 1; Figure 3 is a perspective view of a slightly modified form of condenser; Figure 4 illustrates a further modified form of condenser embodying my invention; and Figure 5 diagrammatically illustrates the nature of the dielectric material on a greatly enlarged scale.

In our aforesaid application there is disclosed a method of treating aluminum and other film-forming metals whereby a film having novel and advantageous characteristics is produced. Preferably this film, contrary to the usual dielectric film formed on aluminum, is of a porous and absorbent nature, and instead of having the metallic sheen and iridescence normally found in dielectric films, the film presents a non-metallic appearance and is of a flat white or gray color. That is, there is little luster or sheen to the film and except at very slight angles of incidence there is no specular reflection from the film. Inasmuch as the metallic appearance of the aluminum is substantially eliminated, it appears probable that the film is opaque rather than transparent or translucent as is the case with ordinary dielectric films.

Thus the film formed by the process of the aforesaid application is of essentially different character from the usual anodic or dielectric films formed on aluminum, magnesium and other so-called film forming metals. One of the principal differences is found in the absorbent and porous character of the film, and it is this characteristic that I utilize principally in the present invention. As disclosed in the aforesaid application, the film formed by the method of that application may be impregnated with suitable dielectric films such as varnishes, waxes or resins, and may have sufficient dielectric strength to withstand several thousand volts. According to the present invention, electrostatic condensers are produced by employing plates with surfaces provided with such coatings impregnated with suitable dielectrical materials.

As described in greater detail in the aforesaid application, the absorbent, porous, flat coating is preferably produced on the surface of aluminum, for example, by subjecting the aluminum to electrolysis as an anode in a potential condensation product of the urea formaldehyde type containing a film forming salt. The following electrolyte gives satisfactory results:

| | Parts |
|---|---|
| Urea | 200 |
| Formaldehyde (40% solution by volume) | 165 |
| Boric acid | 200 |
| Ammonium hydroxide (Sp. Gr. 0.9) | 112 |

The aluminum or other metal is subjected to electrolysis as an anode in the above solution at such a voltage that sparking takes place all over the surface immersed in the electrolyte. For example, with the foregoing electrolyte, the electrolysis may be carried out at around 500 volts. The current density required is not critical and may be, for example, about 2.6 milliamperes per square centimeter. The treatment may be carried on for from 5 minutes to an hour or more depending upon the current density and voltage employed, the extent of the surface being treated, the thickness of film desired, and the nature of the underlying metal, an aluminum alloy, for example, requiring a greater length of time for treatment than high purity aluminum. In any event treatment is continued until the entire surface presents a uniform, white, flat appearance. Continuation of the treatment after the flat, white coating is first produced increases the thickness of the film. Thus by continuing the treatment at the voltage and current set forth above for about 60 minutes in the case of high purity aluminum, a film having a thickness of about 0.005 inch may be produced. Increasing the thickness of the film will, of course, increase the dielectric strength thereof. Films of such thickness are vastly different from the usual dielectric film. Aluminum of high purity (99.8% or better) such as that employed in the manufacture of electrolytic condensers may be used, or aluminum of commercial grade, or various aluminum alloys such as 17S, AL7S, and 24S, may be employed. The alloying metals or impurities seem to have little effect on the final result so long as the formation is carried out for the required length of time.

As pointed out in the aforesaid application, the electrolysis at the sparking voltage apparently has the effect of producing a very uniform coating which adheres strongly to the aluminum, apparently being burnt in due to the sparking operation. Also the coating is flexible and adherent and does not crack or break away from the underlying aluminum surface even though the metal may be bent into a curve with a radius as small as 1/8".

The filmed aluminum may be impregnated with various different dielectric materials by several different methods. For example, the dielectric material may be produced from the potential condensation product employed as electrolyte. In this case it is only necessary to remove the aluminum from the electrolyte bath and then subject it to a baking operation to harden the potential condensation product or to complete the reaction of the materials in the electrolyte to form a resin or condensation product in the pores of the porous and absorbent coating. However, we prefer to wash the metal as it is removed from the electrolyte to substantially remove the electrolyte therefrom, then bake it to dry it and then impregnate it with another dielectric material such as for example various oils, varnishes, waxes, insulating materials such as asphaltum, and resins, either natural or synthetic. As an example of a suitable natural resin, shellac may be employed. Synthetic resins such as phenol-formaldehyde resins and vinyl resins may be used. A suitable inorganic resin is synthetic mica from bentonite. Animal glue may also be used as an impregnating material. This is preferably applied, then baked, and finally coated with a drying oil such as linseed oil, which is also baked.

In carrying out the impregnation, the materials are preferably applied in liquid form and then the metal is subjected to a baking operation to drive off any solvent or vehicle, to assist in removing air from the pores of the coating, and to cure or harden the synthetic resins if such are employed. Infra-red rays may be used to advantage in the baking operation, particularly where synthetic resins are employed. If desired, the usual vacuum or centrifugal impregnating methods may be employed but preferably the impregnating material is screened onto the surface through a fine mesh screen by means of a squeegee or roller. These methods are utilized to insure the penetration of the impregnating materials into the minute pores of the coating, thus providing a film with no entrapped air. The screening operation is particularly advantageous as it insures the production of coatings of uniform, accurately controllable thicknesses, the thickness of the coating depending on the type of screen employed, if other conditions are maintained constant.

The dielectric material so produced on the surface of the aluminum is of highly advantageous character for it is firmly adherent to the aluminum, for the electro-formed film forms a porous framework which securely keys the impregnating material to the underlying metal. This characteristic is illustrated diagrammatically in Figure 5 of the drawing where the metal plate 10 is provided with a dielectric coating 14 made up of the porous electro-formed film 14a, coated and impregnated with impregnating material 14b, the impregnating material penetrating the pores of underlying film as indicated as 14c. I believe the structure of the coating to be substantially as indicated in Figure 5, but I do not desire to be bound by this disclosure, for the actual pores are so minute that I have not as yet been able to determine exactly the nature and structure of the coating.

The anodic film effectively prevents corrosion of the aluminum, and thus precludes any change in capacity when the plates are incorporated in a condenser. Voids cannot form between the film and the metal, and the film is of uniform thickness throughout the area of each plate, making possible the production of efficient condensers of uniform capacity. The impregnated film is of high dielectric strength, the dielectric strength depending on the thickness of the film and to some extent on the nature of the impregnating material, but being in practically all instances greater than the dielectric strength of the impregnating material itself. By reason of these characteristics, electrostatic condensers embodying such plates may be made in compact form, because of their high capacity per unit of area and because of the thinness of the dielectric materials employed.

Plates made according to my invention may be employed in condensers of various types, three of which are illustrated diagrammatically in the drawings. The condenser shown in Figure 1 consists merely of two plates 10 and 11 provided with terminal portions 12 and 13, respectively, and provided with dielectric coatings indicated diagrammatically at 14 and 15, respectively. The terminals 12 and 13 are employed to connect the condenser into an electrical circuit and the coatings 14 and 15, which extend over substantially the entire areas of both plates, constitute the dielectric of the condenser.

As shown in enlarged section in Figure 2, the dielectric films extend with substantially uniform thickness around the corners and edges of the plates as indicated at 16, 17, 18 and 19 for example. (The thickness of the plates and films are exaggerated in the drawings and are not drawn to scale.) This is of importance for it prevents losses or sparking from occurring at the adjacent edges of the plates. The films preferably terminate short of the ends of the terminal members 12 and 13 as indicated at 20 and 21, respectively, this leaving a bare metallic surface on each terminal to which a suitable connection can be made. Obviously more than two plates may be employed in order to increase the capacity. In such cases alternate terminals would be connected together in the usual manner. Also, where the dielectric strength required is not great, it is unnecessary to provide coatings on both plates. In such cases only one of the plates in a condenser such as shown in Figure 1 would be provided with a coating, or in a condenser employing more than two plates, alternate plates would be provided with coatings. It is to be noted, however, that because of the uniform thickness of the dielectric film, the surfaces of the dielectric film conform closely to each other as indicated in Figure 2, and thus there is little if any air trapped between the adjacent plates resulting in an efficient structure of high capacity.

In the modification shown in Figure 3, the plates 22 and 23 having terminals 24 and 25, respectively, are not only provided with coatings or films 26 and 27, respectively, but the plates are additionally separated by a sheet of dielectric material 28, for example waxed paper, mica or other conventional materials may be employed. Fiber glass mats are also suitable for this purpose, or fine glass fibers or other fibrous materials can be incorporated in the impregnating material and thus secured to the plates by the dielectric impregnating material, to serve as additional dielectric spacers. Spacers are desirable when the condenser is to be used with voltages higher than the dielectric strength of the coatings. Similar results can be obtained by immersing spaced plates in oil or by spacing the plates in air, as in a typical variable condenser of the sort used in radio work. However, in these cases, the increased spacing of the plates necessarily results in a reduction in the capacity per unit of area in the condenser plates.

As was the case with Figure 1, the condenser of Figure 3 may consist of more than two plates, and obviously the condensers of Figures 1 and 3 may be enclosed in suitable coverings or casings.

In Figure 4 I have illustrated a simple and compact condenser of high capacity wherein the electrodes 30 and 31 are composed of thin strips of aluminum foil provided with dielectric coatings. These electrodes have terminals 32 and 33, respectively, suitably secured thereto, for example by welding, and are rolled together to form a substantially cylindrical body as indicated at 34. The rolling of the electrodes together is practical because of the firm adherence of the film to the underlying foil. This provides a structure in which a large area and capacity can be secured in small volume and also which can be assembled rapidly and economically. This structure has a further advantage from the manufacturing standpoint, for the foil electrodes can be produced by subjecting aluminum foil to continuous forming, baking and impregnating and curing operations. This can be carried out by passing the foil continuously through first, a cleaning bath; second, the forming bath where the electrolysis is carried out; third, a water bath to wash the electrolyte out of the foil; fourth, an oven to dry the foil thoroughly; fifth, a bath of a suitable impregnating material such as phenol-formaldehyde resin varnish; and finally, an oven to dry and set the varnish in the pores of the absorbent coating.

The porous and capillary nature of the film on the aluminum acts to retain the dielectric coating in place. The oxide film or layer prevents chemical action between the metal and the impregnating material and also acts as a hard incompressible spacer firmly attached to the metal foil. Thus a durable condenser, which will have substantially constant capacity throughout a long life, is assured. Any dielectric suitable for use with high voltage foil condensers and which will penetrate the pores of the oxide film and remain there under temperatures encountered may be used as an impregnating material.

Preferred forms of our invention are described in the foregoing specification. Those skilled in the art will appreciate that various changes and adaptations may be made therein, all without departing from the spirit and scope of our invention. It is therefore to be understood that our patent is not limited to the preferred forms described herein, or in any manner other than by the scope of the appended claim.

We claim:

A plate for an electrostatic condenser comprising a piece of aluminum having a coating of a compound containing aluminum and oxygen thereon, said coating being porous and absorbent and presenting a flat, substantially white, non-metallic appearance before impregnation, and being produced by subjecting the aluminum to electrolysis in an aqueous solution of a film forming material and a potential condensation product of urea and formaldehyde at such a voltage that sparking takes place on the surface of the metal, said coating being impregnated with a dielectric material which fills the pores of the coating and penetrates substantially to the underlying metal and is thereby keyed to the metal.

JOSEPH B. BRENNAN.
LEONA MARSH CONRAD.

REFERENCES CITED

The following references are of record in the file of this patent:

UNITED STATES PATENTS

| Number | Name | Date |
|---|---|---|
| Re. 18,833 | Clark | May 16, 1933 |
| 1,300,394 | Hoffman | Apr. 15, 1919 |
| 1,751,213 | McCulloch | Mar. 18, 1930 |
| 1,843,622 | Norton | Feb. 2, 1932 |
| 1,947,112 | Ruben | Feb. 13, 1934 |
| 1,986,162 | Clark | July 10, 1934 |
| 2,007,792 | Clark | July 9, 1935 |
| 2,098,774 | Coursey et al. | Nov. 9, 1937 |
| 2,294,717 | Carney | Sept. 1, 1942 |
| 2,318,184 | Rojas | May 4, 1943 |
| 2,346,658 | Brennan et al. | Apr. 18, 1944 |

FOREIGN PATENTS

| Number | Country | Date |
|---|---|---|
| 385,763 | Great Britain | Jan. 5, 1933 |
| 388,787 | Great Britain | Mar. 3, 1933 |